United States Patent Office 3,217,787
Patented Nov. 16, 1965

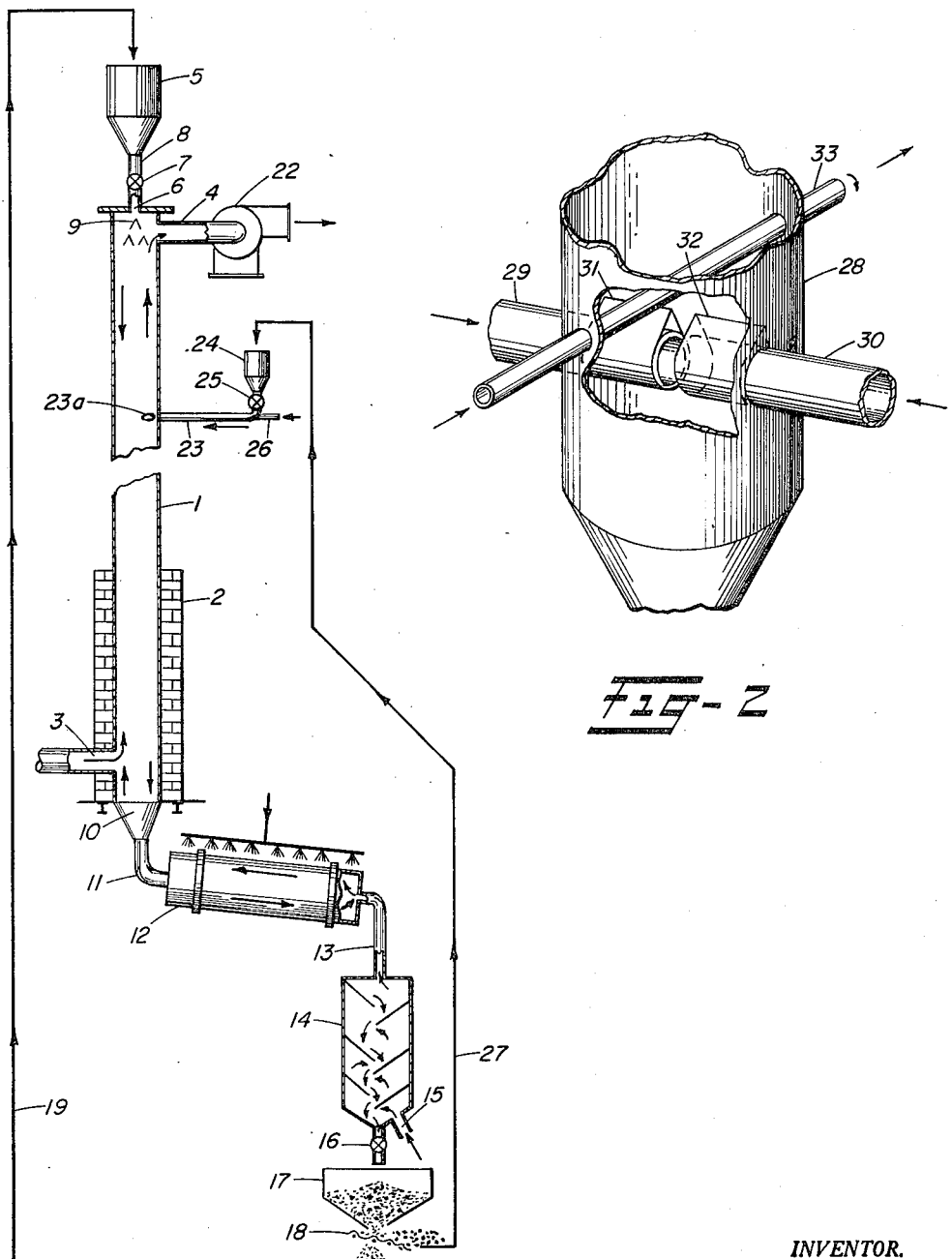

3,217,787
METHOD FOR COOLING A GASEOUS SUSPENSION OF TITANIUM DIOXIDE
Peter J. Preston, Lynchburg, Va., assignor to American Cyanamid Company, New York, N.Y., a corporation of Maine
Filed Aug. 18, 1961, Ser. No. 132,367
9 Claims. (Cl. 165—1)

The present invention relates to the cooling of hot gaseous suspensions of titanium dioxide pigment particles. More particularly, the invention relates to the cooling of gaseous suspensions of titanium dioxide from temperatures at which titanium dioxide pigment particles are tacky to temperatures at which they are not tacky. The invention includes apparatus in which the process may be performed.

Titanium dioxide pigment is produced by subjecting titanium tetrachloride gas to combustion with oxygen; the product is essentially a susepnsion of titanium dioxide pigment particles in chlorine, although other gases for example carbon dioxide, nitrogen and oxygen may be present.

The combustion proceeds in the temperature range of about 1200° C.–1800° C. From this range, down to about 700° C. or 600° C.–400° C. (the "tack point" of titanium dioxide pigment), titanium dioxide particles behave as if they were plastic and sticky. This tackiness (or some other property resembling tackiness and hereinafter considered to be the same) causes the pigment to form soft loosely adherent coatings on surfaces with which it comes into contact, and its a major source of trouble in pigment manufacture.

It has long been recognized that for this and other reasons the pigment suspension should be cooled to a temperature below the tack point of the pigment therein as rapidly as possible, once the pigment has left the flame, and Gregory U.S. Patent No. 2,909,409 (1959) discloses the use of cool pigmentary titanium dioxide for this purpose. In the process of that patent the pigment particles necessarily move concurrently with the hot gaseous suspension being cooled. Consequently, their terminal temperature, i.e., their temperature when their cooling action is complete, is the same as the temperature of the gaseous suspension. This in turn sets a practical limit upon the efficiency of the process.

For example, in the process of the patent about 15 lb. of titanium dioxide pigment at 20° C. are needed to cool 1 lb. of titanium dioxide pigment in the gaseous suspension from 1400° C. to 350° C. The cause of this high consumption of coolant is the fact that in that process the absorptive capacity of the coolant pigment for heat can be utilized to no more than a small extent.

The discovery has now been made that hot gaseous suspensions of titanium dioxide pigment can be cooled more efficiently and with adequate rapidity by continuously passing the suspension upwardly through a vertical tower and showering coarse inert cooler particles down through the suspension as it rises.

By this means, for example, it is possible to cool such suspensions from 1400° C. to 350° C. in less than 4 seconds by the use of about 8.5 lb. of coolant particles per pound of titanium dioxide pigment cooled in the gaseous suspension.

The invention has the following advantages.

(1) The coolant particles, being coarse, separate themselves automatically by free gravity fall from the gaseous suspension being cooled. Special equipment for the separation of the coolant particles is therefore not required.

(2) Since the coolant particles move in countercurrent flow, their exit temperature from the cooling tower may be comparatively close to the entrance (i.e., maximum) temperature of the gaseous suspension to be cooled. The absorptive capacity of the coolant particles for heat may thus be utilized to a major extent.

(3) The coolant particles need not be titanium dioxide, but may be a different material having better thermal properties than titanium dioxide, for example a higher absorptive capacity for heat or a higher tack or softening point.

The success of the method of the present invention in effecting economical cooling in one step is primarily due to two facts. The first is that the coolant particles are of sufficiently large size to move in countercurrent flow in free gravitational fall through the rising gaseous suspension in the tower and yet present a large heat transfer surface per unit of weight under conditions favoring rapid transfer of heat. The second is that the method permits completely automatic separation of the coolant particles from the cooled gaseous suspension.

The invention will be further described with reference to the drawing, wherein:

FIG. 1 illustrates (largely in schematic section not to scale) one form of apparatus suitable for the practice of the process of the present invention, and FIG. 2 illustrates in schematic isometric perspective (not to scale) the base of a cooling tower such as shown in FIG. 1 without thermal insulation but containing a metal halide-oxygen burner.

In FIG. 1 there is shown cooling tower 1 the lower part of which is constructed of firebrick 2 provided with lower lateral inlet orifice 3 for admission of the hot pigmentary suspension to be cooled, upper lateral outlet orifice 4 for discharge of cooled pigmentary suspension, hopper 5 for storage of cool coolant particles, and top orifice 6 for admission of coolant particles from hopper 5 through star feeder 7 and conduit 8. Near the top of the tower are several cone distributors of which one 9 is identified which distribute falling coolant particles uniformly in the tower. Bottom orifice 10 is provided for discharge of hot coolant particles. Pipes 11 and 13 are provided for conveying hot coolant particles respectively to water-cooled rotary drum cooler 12 and gas elutriator 14. Elutriator 14 is supplied with a gas under pressure through orifice 15 and discharges cool coolant particles through gas-tight valve 16 into hopper 17. The cool coolant particles pass through optional shaker screen 18 and are returned by closed gas lift, bucket hoist or other suitable means 19 to hopper 5.

Optional exhaust fan 22 provides a means for keeping the interior of the tower under slight negative pressure thereby facilitating return of titanium dioxide from elutriator 14 and preventing leakage of gas from tower 1.

Optional conduit 23 enters tower 1 tangentially through orifice 23a preferably at a level where the temperature of the rising gaseous suspension is below the tack point of the pigment therein and provides means whereby large spheriodal particles can be blown against the interior wall of the tower thereby scouring off the deposits of pigment which tend to form thereon. Conduit 23 is supplied with large spheriodal particles from hopper 24 through star feeder 25 and is supplied with gas under pressure through conduit 26 whereby the particles can be blown into tower 1.

The oversize from screen 18 are the scouring particles which are returned to hopper 24 by lift 27.

In FIG. 2, tower bottom 28 contains a metal chloride-oxygen burner of the type disclosed and claimed in co-pending Wikswo et al. U.S. application Serial No. 748,742 filed on July 15, 1958. The burner consists essentially of two 12" inside diameter gas supply conduits 29 and 30 with the ends spaced apart carrying deflector ridges 31 and 32 adapted to minimize attrition from the action of falling coolant particles. The gap between the burner tubes is substantially covered by deflector or guard tube 33 which ensures that substantially no coolant particles will fall through the gap between tubes 29 and 30 while permitting the particles to impinge upon the ends of conduits 29 and 30 thereby scouring any adherent pigment therefrom. Deflector tube 33 is adapted to rotate by means not shown so that it will be uniformly scoured of adherent pigment by falling coolant particles.

In starting up the apparatus of FIG. 1 by preferred procedure, coolant particles are circulated through the circuit composed of hopper 5, conduit 8, start feeder 7, cooling tower 1, rotary cooler 12, elutriator 14, screen 18 and lift 19 at the rate of about 8.5 lb. of particles per pound of titanium dioxide to be cooled, exhaust fan 22 is turned on, and the hot gaseous suspension from a titanium tetrachloride oxidizing unit is admitted at normal temperature (about 1400° C.) into the base of the tower through orifice 3.

At the same time very coarse (4 to 10 mesh) particles are discharged from hopper 24, and compressed tail gas is supplied to pipe 26 so as to project the particles with scouring action around the inside of the tower.

The rate of supply of coolant particles to tower 1 and their initial temperature are then adjusted by control of star feeder 7 and cooler 12 so that the gaseous suspension exiting through orifice 4 has the temperature desired. This temperature is below the tack point of the pigment, and may be as low as 100° C.

In FIG. 1, the upwardly pointing arrows indicate the flow of the gaseous suspension and the downwardly pointing arrows indicate the movement of the coolant and scouring particles (when used).

The apparatus of FIG. 2 is started up in substantially the same manner, except that to prevent over-heating of the apparatus the burner is not lit until circulation of the coolant particles is under way and cold water is circulated through deflector tube 33.

In operation, the coolant particles generally carry with them a substantial amount of pigment. A part of this pigment is separated from the coolant particles in cooler 12 and the remainder is largely knocked off in elutriator 14. This pigment is recycled to the base of the cooling tower by compressed tail gas admitted through pipe 15.

The flow rate of the gaseous suspension upwardly through the cooling tower, the dimensions of the tower, and the particle size of the cooling material used may be varied widely while cooling the gaseous suspension to a temperature below the tack point of the pigment.

The process of the present invention includes the cooling of hot gaseous suspensions wherein the titanium dioxide contains silica and other modifiers customarily present and wherein the gas phase contains carbon dioxide, hydrochloric acid, water, or one or more nitrogen oxides.

As coolant particles, any particles of the size ranges described herein may be used which are substantially inert to the suspension being treated. Since the exit temperature of the coolant particles need not be as high as the temperature of the entering gaseous suspension the particles need not be thermally refractory. Silica, titanium dioxide, and alumina are preferred as these materials are neutral tinctorially, have high specific heats and softening points, are resistant to thermal shock and abrasion, and are readily available. Since the specific heat of titanium dioxide is 0.21 B.t.u./lb./° F. and the specific heat of alumina is 0.29 B.t.u./lb./° F., the use of alumina permits a saving of 26% in the weight of coolant particles handled. Colored granular material may be used if sufficiently hard and abrasion-resistant to be tinctorially inert.

The coolant particles used in the process of the present invention are predominantly in the size range of about 10 to 100 mesh [Tyler standard screen; cf. Chemical Engineers' Handbook 3rd ed. (N.Y., 1950) p. 963]. Their temperature on admission to the tower is preferably low, for example 20°–100° C.

Particles larger than about 10 mesh are not preferred because they fall too swiftly. As a result, their absorption capacity for heat is not fully utilized unless high towers or high gas suspension speeds are employed.

Particles finer than about 100 mesh are not preferred because they have as slow a rate of fall and hence do not automatically separate themselves from the gaseous suspension unless the speed of the suspension is kept very low.

It is preferred to use coolant particles in the range of 40 to 60 mesh. Such particles are sufficiently small to have a rapid heat transfer rate and yet are sufficiently large to fall rapidly through a rising pigment suspension moving at a satisfactory speed from the pigment production point of view.

The present invention provides a convenient means for cooling the hot gaseous suspension to any temperature below the tack point of the pigment (below about 600° C.–400° C.).

Thus, if desired, the suspension may be cooled to normal packing temperature (100° C.) or even lower.

However, it is within the scope of the invention to cool the gaseous suspension temperature just below the tack point of the pigment by the process of the present invention. The suspension may then be further cooled by conventional means, for example, by a rotary drum cooler.

In general, most efficient utilization of the process of the present invention generally takes place when the height of the cooling tower and the upward speed of the gaseous suspension therein are correlated so that the coolant particles are discharged from the bottom of the reactor, at their tack point or at the entrance temperature of the gaseous suspension, whichever is lower, and the suspension is discharged from the top of the reactor at a temperature just below the tack point of the pigment therein. By this means the absorptive capacity of the coolant particles for heat is utilized to its practical maximum, and maximum opportunity is presented to cool the suspension by a conventional and more economical method.

It is within the scope of the invention to admit part of the coolant particles near the middle of the cooling column so as to afford more intense cooling to the extremely hot suspension as it starts to rise through the tower, thereby decreasing the detrimental effect of the hot gas upon the lower part of the apparatus.

The invention is further illustrated by the examples which follow. These examples are preferred embodiments of the invention and the invention is not to be regarded as limited thereto.

*Example 1*

The following illustrates the practice of the invention in a three-tons per day pilot plant similar to that of FIG. 1 of the drawing.

The cooling tower is 2 feet in inside diameter and 20 feet high, and is made of ⅛″ aluminum sheet, the bottom six feet being protected by a lining of fire-brick.

The apparatus is placed in operation by starting the drum cooler, supplying cold compressed tail gas (a chlorine-carbon dioxide mixture) to the elutriator, circulating alumina particles in the size range of 20 to 80 mesh at 20° C. from the top of the tower at the rate of about 72 lb. per minute, and projecting a stream of cold 4 to 10 mesh spheroidal alumina particles by compressed tail gas through a ½″ (inside diameter) tangential aluminum pipe ten feet up the tower, so as to scour the lower inside portion of the tower therewith.

There is then admitted to the bottom of the tower through the inlet conduit at the rate of about 4.2 lb. ($TiO_2$ basis) per minute a hot gaseous suspension produced by combuistion of titanium tetrachloride with oxygen and carbon monoxide. The entrance temperature of the suspension is approximately 1400° C. The suspension analyzes 32% by weight of $TiO_2$ and 57% by weight of chlorine, the remainder being chiefly carbon dioxide and nitrogen. The suspension moves upwardly through the tower at the initial speed of 1.5 foot per second.

The temperature of the alumina particles on exiting from the bottom of the tower is about 400° C. Their temperature on discharge from the elutriator is about 90° C. The rate of admission of coolant particles into the tower is adjusted so that the temperature of the gaseous suspension on discharge from the top of the tower is 125° C.

In the tower, the average absolute velocity of the falling alumina coolant particles is about 5.5 feet per second so that their average velocity relative to the rising gaseous suspension is about 6.5 feet per second, giving a contact time of about 3.5 seconds. The coolant particles take up and carry off $6.6 \times 10_5$ B.t.u. of heat per hour.

The coolant particles on discharge through the bottom of the tower carry with them about 15% of their weight of titanium dioxide pigment. This pigment is loosely adherent of the coolant particles, which shows that while the temperature of the surface of these particles rose above the tack point of the pigment the pigment did not fuse thereto. Substantially all of this pigment is returned to the tower by the compressed air supplied to the base of the elutriator.

*Example 2*

The apparatus is substantially the same as that employed in Example 1, except that the pigment suspension is not introduced into the tower but is formed in the tower by a titanium tetrachloride-oxygen burner installed at the base as shown in FIG. 2.

The burner essentially consists of two 12" inside diameter opposing gas supply conduits 12" in inside diameter with the ends spaced 2.5" apart constructed as disclosed and claimed in copending Wikswo et al. U.S. application Serial No. 748,742 filed on July 15, 1958. Fall of coolant particles through the flame is prevented by a water-cooled guard pipe as shown in FIG. 2.

The operating procedure otherwise is similar to that of Example 1.

*Example 3*

The procedure of Example 1 is repeated, except that an alumina of finer (60 to 80 mesh) average particle size is employed as coolant, and the weight thereof circulated is decreased to 36 lb./minute.

The exit temperature of the gaseous suspension is 150° C., the exit temperature of the coolant particles is 700° C. (just below the tack point of the pigment), and 8.5 lb. of coolant particles are used per pound of pigment in the suspension.

I claim:

1. A process which comprises passing a gaseous suspension of titanium dioxide pigment at a temperature above the tack point of the pigment upwardly through an elongated zone, passing a mass of inert particles in the size range of about 10 to 100 mesh downwardly in said elongated zone in countercurrent contact with said upflowing gaseous suspension in order to cool the titanium dioxide pigment, withdrawing cooled gaseous suspension of titanium dioxide pigment from the upper part of elongated zone, withdrawing hot inert particles containing adhering titanium dioxide pigment from the lower part of the elongated zone, passing the hot inert particles containing titanium dioxide pigment to a cooling zone wherein the temperature thereof is reduced to below the tack point of the titanium dioxide pigment, passing the cooled inert particles containing titanium dioxide pigment to an elutriation zone wherein the titanium dioxide pigment is elutriated from the inert particles by means of a gasiform material, and passing the elutriated titanium dioxide pigment to the elongated zone.

2. The process of claim 1 being further characterized in that the elutriating gaseous material containing titanium dioxide material passes from the elutriating zone through the cooling zone prior to being returned to the elongated zone and thereby the hot inert particles are subjected to an elutriation treatment while being cooled.

3. The process of claim 1 being further characterized in that the gaseous material employed in the elutriation zone is the tail gas of the system.

4. The process of claim 1 wherein the gaseous suspension of titanium dioxide pigment is introduced into the elongated zone at a temperature of about 900 to 1800° C. and is withdrawn therefrom at a temperature below about 400–600° C.

5. A process for cooling a hot gaseous suspension of titanium dioxide particles from a temperature above to a temperature below their tack point which comprises passing said hot suspension upwardly through an elongated zone, passing a mass of inert coolant particles having a size within the range of about 10 to 100 mesh downwardly in said zone in countercurrent contact with said upflowing gaseous suspension in an amount sufficient to cool the pigment suspension to a temperature below its tack point, thereby cooling said pigment particles to said temperature while part of the pigment adheres loosely to the coolant particles, withdrawing the cooled suspension of titanium dioxide pigment from the upper part of the elongated zone, withdrawing the hot inert particles and their adherent titanium dioxide from the lower part of said zone, cooling the particles to a temperature below said tack point and dislodging adherent titanium dioxide therefrom, and recycling the resultant cooled inert particles to the upper part of said elongated zone for reuse in the process.

6. A method according to claim 5 wherein the particles of coolant withdrawn from the lower part of the elongated zone are cooled and part of the adherent titanium dioxide is dislodged by passing said particles through a cooled rotating drum.

7. Process according to claim 5 wherein substantially all of the cooler inert particles are predominantly between 40 and 60 mesh in size.

8. Process according to claim 5 wherein the suspension is cooled to a temperature below 200° C. by said particles.

9. Process according to claim 5 wherein coarse cooler inert particles are projected tangentially into the tower at a level where the temperature of the suspension is above the tack point of the pigment therein.

References Cited by the Examiner

UNITED STATES PATENTS

| | | | |
|---|---|---|---|
| 1,329,158 | 1/1920 | Bappe | 23—295 |
| 2,155,119 | 4/1939 | Ebner | 23—1 |
| 2,580,635 | 1/1952 | Winter | 165—1 X |
| 2,650,814 | 9/1953 | Howden | 23—295 |
| 2,721,626 | 10/1955 | Rick. | |
| 2,760,846 | 8/1956 | Richmond et al. | 23—202 |
| 2,789,886 | 4/1957 | Kraus | 23—202 |
| 2,909,409 | 10/1959 | Gregory | 23—202 |
| 3,033,659 | 5/1962 | Fischer | 23—295 |
| 3,048,381 | 5/1962 | Corson | 23—195 |

ROBERT A. O'LEARY, *Primary Examiner.*

MAURICE A. BRINDISI, CHARLES SUKALO,
*Examiners.*